United States Patent [19]

Frerichs et al.

[11] Patent Number: 4,967,822

[45] Date of Patent: Nov. 6, 1990

[54] PNEUMATIC TIRE FOR A VEHICULAR TIRE AND WHEEL ASSEMBLY

[75] Inventors: Udo Frerichs, Langenhagen; Carsten Boltze, Wennigsen, both of Fed. Rep. of Germany

[73] Assignee: Continental Aktiengesellschaft, Hanover, Fed. Rep. of Germany

[21] Appl. No.: 306,345

[22] Filed: Feb. 3, 1989

[30] Foreign Application Priority Data

Feb. 13, 1988 [DE] Fed. Rep. of Germany ....... 3804505

[51] Int. Cl.$^5$ ............................................ B60C 15/024
[52] U.S. Cl. .................................... 152/544; 152/380; 152/DIG. 20
[58] Field of Search ...................... 152/544, 380, 379.5, 152/379.3, DIG. 20, 539

[56] References Cited

U.S. PATENT DOCUMENTS 1,915,963 6/1933 Wait ................................. 152/544 X
4,781,232 11/1988 Klose ............................... 152/544 X

FOREIGN PATENT DOCUMENTS 122731 7/1944 Australia .............................. 152/544
893164 9/1953 Fed. Rep. of Germany ...... 152/544
938767 2/1956 Fed. Rep. of Germany ...... 154/544
3420402 12/1985 Fed. Rep. of Germany ... 152/DIG. 20
1015316 9/1952 France .................................. 152/544

Primary Examiner—Michael W. Ball
Assistant Examiner—Geoffrey L. Knable
Attorney, Agent, or Firm—Robert W. Becker & Associates

[57] ABSTRACT

A pneumatic tire for a vehicular tire and wheel assembly that includes a rigid wheel rim, which is provided with essentially radially inwardly extending rim flanges, rim seating surfaces disposed on the radially inner side of the rim ring and inclined in the transverse direction, and a recessed mounting bed for each tire bead, and that also includes a pneumatic tire of elastomeric material, with bead seating surfaces of the tire beads being disposed adjacent to the rim flanges on the rim seating surfaces, and with the carcass of the tire being anchored in the beads by being looped about pressure-resistant bead cores. In order despite manufacturing-related tolerance differences of the rims and tires to obtain an improved bead seating, each bead is provided with recesses disposed therein in such a way that when the tire is mounted on the rim and inflated to the operating pressure, a base portion of the bead that rests against the rim seating surface exerts thereon a compression pressure in the range of from 8 to 56%.

18 Claims, 4 Drawing Sheets

PNEUMATIC TIRE FOR A VEHICULAR TIRE AND WHEEL ASSEMBLY

BACKGROUND OF THE INVENTION

1. Field of the Invention

The present invention relates to a pneumatic tire for a vehicular tire and wheel assembly that includes a rigid wheel rim, which is provided with essentially radially inwardly extending rim flanges, rim seating surfaces that are disposed on the radially inner side of the rim ring and are inclined in the transverse direction, a recessed mounting bed for each tire bead, and possibly with support surfaces on the radially outer side of the rim ring to allow driving with an uninflated tire, and that also includes a pneumatic tire of rubber or rubber-like synthetic material, with bead seating surfaces of the tire beads being disposed adjacent to the rim flanges on the rim seating surfaces on the radially inner side of the rim ring, and with the carcass of the tire being anchored in the beads by being looped about pressure-resistant bead cores.

2. Description of the Prior Art

A vehicular tire and wheel assembly of this general type is described, for example, in German Offenlegungsschrift No. 30 00 428-Rach et al dated July 9, 1981, belonging to the assignee of the present invention. A further tire and wheel assembly of this type is disclosed in German Offenlegungsschrift No. 36 21 849-Spitz dated Jan. 7, 1988, also belonging to assignee of the present invention. Such tire and wheel assemblies are distinguished by improved driving properties and especially by a very high driving comfort. As a result of the arrangement of the tire beads on the radially inner periphery of the wheel rim, the rim flanges are disposed in the interior of the tire, so that the side walls of the tire can yield elastically, i.e. can deflect, in an unobstructed manner, and can bulge laterally outwardly.

The tire beads are essentially disposed against three regions of the rim, namely on radially inner seating surfaces of the rim ring, against the perpendicular surfaces of the rim flanges, and against the radially inner surfaces of the rim flanges. Due to the carcass forces that act on the bead core, radially inwardly directed forces, as well as pivot moments, are generated at the tire bead and must be absorbed at the three aforementioned seating surfaces on the rim. It is no simple matter to optimally configure the portions of these seating surfaces for the overall seating of the bead on the rim. These difficulties increase even more especially due to unavoidable tolerances during the mass production of rims and tires. In an attempt to overcome these problems, it was proposed in the aforementioned German Offenlegungsschrift No. 36 21 849 Spitz dated Jan. 7, 1988 to provide on the radially inner surface of the bead, at least in the axially inner region thereof, a ring and/or disk-like support element for absorbing the radial forces and pivot moments of the bead, with this support element being centered relative to the axis of rotation of the rim on non-elastic parts of the tire and wheel assembly. Thus, with this solution, in addition to the tire and the rim, as a further structural component, a support element is required that furthermore must be capable of being centered on the rim with suitable means. With this heretofore known tire and wheel assembly, a gap is located between the tire bead and the rim ring, so that the tire bead does not rest directly against the radially inner periphery of the rim ring.

It is an object of the present invention to resolve the aforementioned problems with straightforward means, in other words, a tire and wheel assembly should be provided that has an improved seating of the bead on the rim, and where in particular tolerance differences that occur during the manufacture of the tires and rims exert no noticeable influence upon the rotational properties of the assembly.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
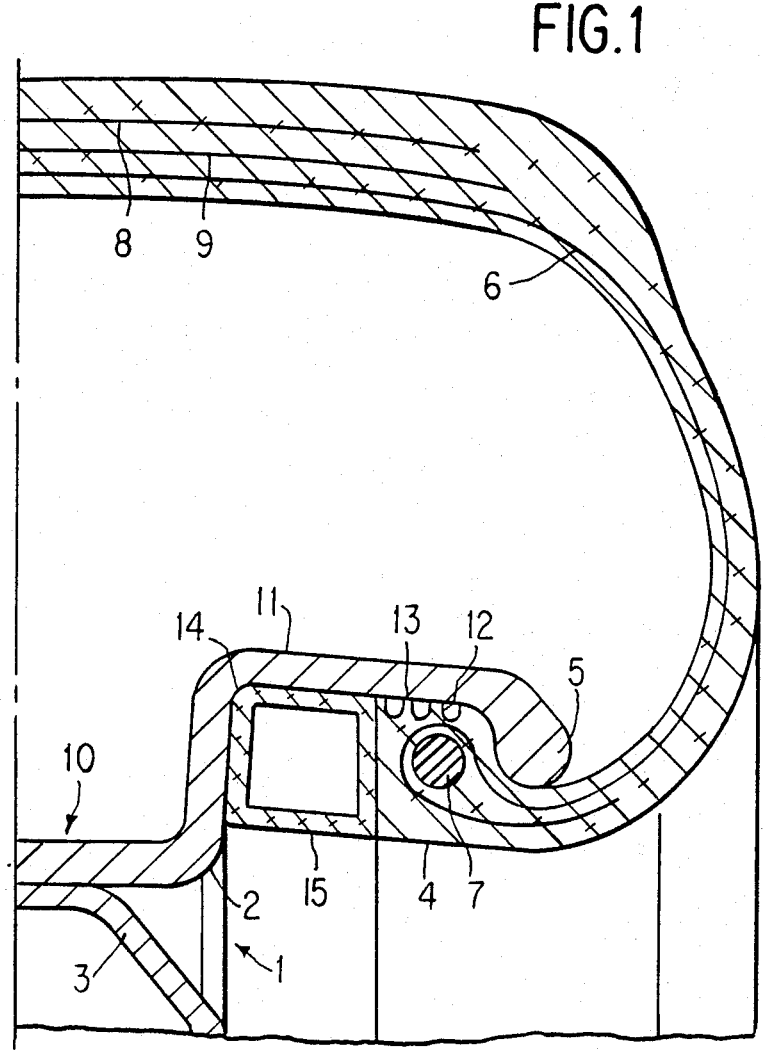
FIG. 1 is a partial radial cross-sectional view through one exemplary embodiment of the inventive tire and wheel assembly, with the tire being mounted and ready for use, and with the bead seating surface being provided with U-shaped recesses.

The tire and wheel assembly of the present invention is characterized primarily in that the bead seating surfaces of the tire bead are provided with raised portions and recesses, and in that when the tire is mounted on the rim and is inflated to operating pressure, the raised portions of the bead seating surfaces exert upon the rim seating surfaces a compression pressure that in the region of the bead bases is from 8 to 56% and at the level of the center of the bead core is from 1 to 26%.

A further solution is characterized primarily in that side of the tire bead that faces the central radial plane of the tire and wheel assembly is provided, at least in the vicinity of the bead bases, with groove-like or notch-like recesses that preferably extend in the circumferential direction, and in that when the tire is mounted on the rim and is inflated to operating pressure, the bead bases exert upon the rim seating surface a compression pressure that is from 8 to 56%.

Finally, the two aforementioned solutions can also be combined with one another.

With a modern standard tire, the compression pressure is defined as the ratio of the pertaining rubber (thickness) beneath the bead core to the distance between the core and the rim. This method of measuring is adopted within the framework of the present application, with the rubber thickness (including the carcass fabric) above the core being what is critical. The compression pressure above the center of the core is then given by the $$\left(\frac{W_1}{F_1} - 1\right) \cdot 100[\%]$$

with
 $W_1$ = the rubber thickness between the radially outer edge of the bead core and the radially outer surface of the bead at the level of the center of the bead core, with the tire relaxed, and
 $F_1$ = the distance between the radially outer edge of the bead core and the rim ring at the level of the center of the bead core with the tire mounted.

Similarly, the compression pressure at the bases of the beads is defined by the following equation $$\left(\frac{W_2}{F_2} - 1\right) \cdot 100[\%]$$

with
 $W_2$ = the rubber between a line that extends parallel to the axis of rotation of the tire and through the radially outer edge of the bead core, and the radially outer surface of the bead at the level of the bead bases, and
 $F_2$ = the distance between a line parallel to the axis of rotation of the tire and through the radially outer edge of the bead core, and the rim ring at the level of the bead bases with a mounted tire.

The present invention proceeds from the recognition that on the one hand during driving operation with an inflated tire, when the carcass forces are completely effective, a complete resting of the bead seating surfaces on the radially inner periphery of the rim ring must be assured, and that on the other hand, when due to manufacturing tolerances too much rubber is present in the tire bead radially outwardly of the bead core, this rubber can shift or be displaced laterally into recesses of the tire bead, so that each bead can rest against the adjacent rim flange in such a way that a uniform spacing between the bead core ring and the rim flange exists over the entire periphery. This results in a further improvement of the rotational properties and the sealing function in all operating positions. Furthermore, due to the presence of numerous recesses, the advantage of reducing weight and saving rubber is obtained.

Pursuant to one advantageous specific embodiment of the present invention, the two previously proposed independent solutions can also be combined with one another. In other words, the tire bead can be provided with recesses not only in the radially outer bead seating surface but also in the axially inner side surface.

Pursuant to a further advantageous specific embodiment of the present invention, the recesses can be designed in such a way that the ribs of the vulcanizing mold used to form these recesses are effective during vulcanization of the tire for fixing the bead core rings in the beads.

Depending upon the operating pressure with which the tire is to be driven, the compression pressure with which the tire bead is to rest against the rim ring can be selected in a defined manner with the aid of the present invention.

Further specific features of the present invention will be described in detail subsequently.

DESCRIPTION OF PREFERRED EMBODIMENTS

Referring now to the drawings in detail, the vehicular tire and wheel assembly of FIG. 1 essentially comprises a rigid one-piece wheel rim 1, which is formed in the customary manner by welding a rim ring 2 onto a dish-shaped rim portion or well 3, and further comprises a tire, the beads 4 of which are disposed on the radially inner periphery of the rim ring 2 adjacent laterally outwardly disposed and essentially radially inwardly extending rim flanges 5.

The tire is preferably a belted tire having a relatively small height-to-width ratio, with a radial carcass 6 being anchored in the beads 4 by being looped around pull-resistant and compression-resistant bead cores 7. Disposed between the carcass 6 and the tread 8 is a conventional reinforcing belt 9.

The central portion of the rim ring 2, on the radially outer side, is in the form of a conventional drop-center well 10, whereas the lateral portions of the rim ring 2 are inclined in the transverse direction and serve as support surfaces for driving without air pressure, for example when the tire is punctured or otherwise becomes uninflated. The lateral portions of the rim ring 2 that are provided with the support surfaces 11 extend at an incline in the transverse direction, with this incline for passenger car rims being 5° relative to the axis of rotation of the wheel rim. Due to this inclination, conical rim seating surfaces 12 are formed on the radially inner side of the rim ring 2. After the tire has been mounted, bead seating surfaces 13 of the tire bead 4 are disposed on the rim seating surfaces 12. By extending the rim seating surfaces 12 axially inwardly, with a similar inclination, recessed mounting beds 14 are formed in these regions. These recessed mounting beds 14 are necessary in order to be able to mount a tire on a one-piece rim. After the tire has been mounted, the spaces formed by the recessed mounting beds 14 can be filled by covering rings 15 in order to prevent dirt and water from entering the spaces.

The configuration of the tire and the rim in the region of the tire beads 4 and the rim flanges 5 will now be described in detail with the aid of the diagrammatic view of FIG. 2 that illustrates the principle of the present invention. The orientation of the rim ring 2 with the inclined support surfaces 11 and the rim flanges 5 corresponds to the rim of FIG. 1. In contrast, the tire bead 4 with the bead core 7 is shown in a relaxed position that it would assume without the presence of the rim ring 2, on the premise that the axes of the tire and the rim are identical. It can be seen that starting from approximately a common point P (the point of intersection between the rim seating surface 12 and the bead seating surface 13 in a radial cross section), the bead seating surface 13, i.e. the radially outer surface of the tire bead 4, rises axially inwardly more sharply than the rim seating surface 12, which is provided with an inclination of 5°; in particular, the bead seating surface 13 is provided with two different angles of inclination, namely $\alpha_2$ of first about 7°, L and in the axially inner portion, $\alpha_2$ of approximately 10°.

Disposed in the region of the bead seating surface 13 are three circumferentially extending recesses 16 in the form of U-shaped grooves. The rubber parts remaining between the grooves 16 form rib-like raised portions 17. Due to the fact that the outer diameter of the tire in the bead region is greater than the respectively associated inner diameter of the rim, there is achieved the effect that after the tire has been mounted and inflated, the tire bead 4 rests against the rim seating surface 12 on the rim ring 2 with a specific compression pressure. The recesses 16 allow the rubber material that is to be compressed to be shifted or displaced into these spaces. Due to the thickness of the rubber material $W_1$ (including carcass ply), as measured from the radially outer edge of the bead core 7 to the radially outer surface of the bead 4, the compression pressure that is exerted by the inflated tire at the level of the bead core 7 upon the rim seating surface 12 is determined, in conformity with the aforementioned definition, by the following equation $$\left(\frac{W_1}{F_1} - 1\right) \cdot 100[\%]$$

Numerically, the compression pressure in this region should be between 1 and 26%, preferably between 1 and 10%, with a particularly expedient value being approximately 6.5%. The higher compression values are achieved if the angle of inclination $\alpha_1$ of the rim seating surface 12 is between 8 and 13°. Intermediate values are obtained where $\alpha_1$ is between 5.5 and 7°, while lower compression values are obtained where $\alpha_1$ is just slightly greater than 5°. A higher compression value could also be achieved if in the axially outer bead portion the tire diameter in the radially outer bead portion is greater than the associated inner diameter of the rim, with the rim seating surface and the bead seating surface extending parallel to one another.

Figure 2:
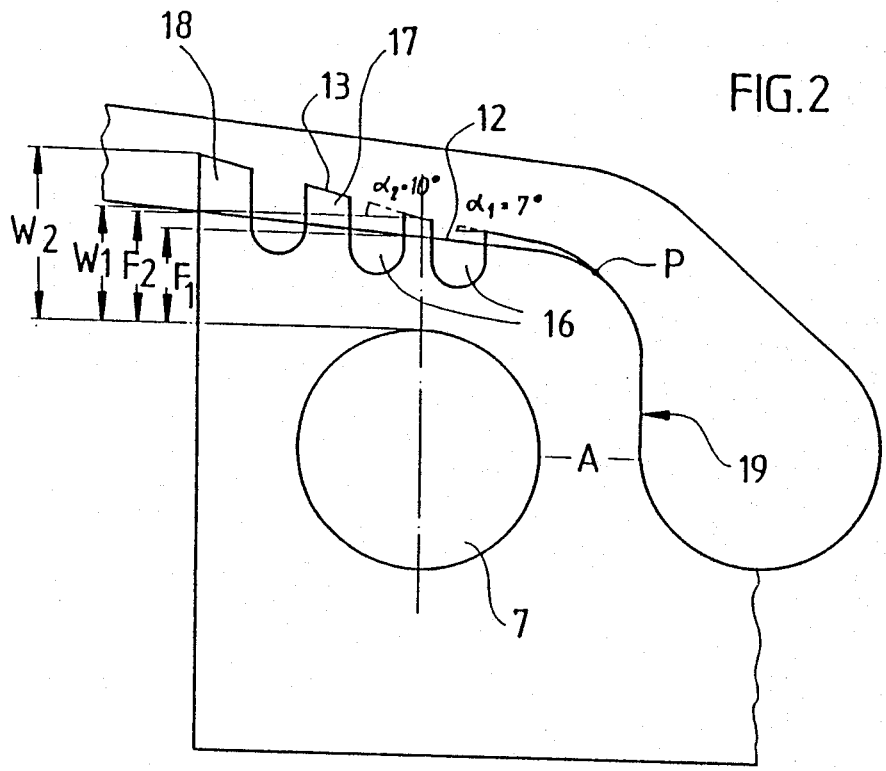
FIG. 2 is a radial cross-sectional view in the form of a schematic sketch to show the principle of the present invention and shows a compression-free tire bead that in the region of the bead seating surface is provided with three groove-like recesses, with a rim portion being associated with the tire bead.

Pursuant to the aforementioned definition for the compression pressure in the region of the bases 18 of the beads, with the thicknesses $W_2$ and $F_2$ having the same meaning in FIG. 2, the compression pressure in the region of the bead bases 18, with the tire inflated, has values of from 8 to 56%, with a preferred range being from 15 to 40%, and a particularly expedient value being approximately 28%. Thus, the compression pressure at the level of the center of the bead core is preferably lower than that at the bead bases. The high compression values are obtained where the angle of inclination $\alpha_2$ for the bead seating surface 13 in the region of the axially inner portion of the tire bead 4 is between 12 and 15°, while the particularly favorable compression value of approximately 28% is obtained with an angle of inclination $\alpha_2$ of approximately 10°. With the aforementioned angles of inclination $\alpha_1$ and $\alpha_2$ for the bead seating surface 13, an angle of inclination of 5° for the rim seating surfaces 12 is presumed, as is the case with passenger car rims.

For passenger car tires, the grooves 16 can have a width of from 2 to 3 mm, while the depth thereof should not exceed 4 mm. Up to a maximum of three to four grooves can be disposed next to one another. These grooves can preferably be formed as exactly circumferential grooves. In this case, the axially inner groove should be delimited axially inwardly by a raised portion 17 in order to be able to prevent dirt and water from penetrating the gaps between the rim ring 2 and the tire bead 4. Furthermore, in the region of the point P (see FIG. 2), and axially outwardly therefrom, no grooves should be present so that the sealing effect of the tire bead 4 in the region of the sealing surfaces 19 is not endangered. The recesses 16 in the bead seating surface 13 should have a maximum surface component of up to 40% (negative component) of the total bead seating surface 13.

Figure 3:
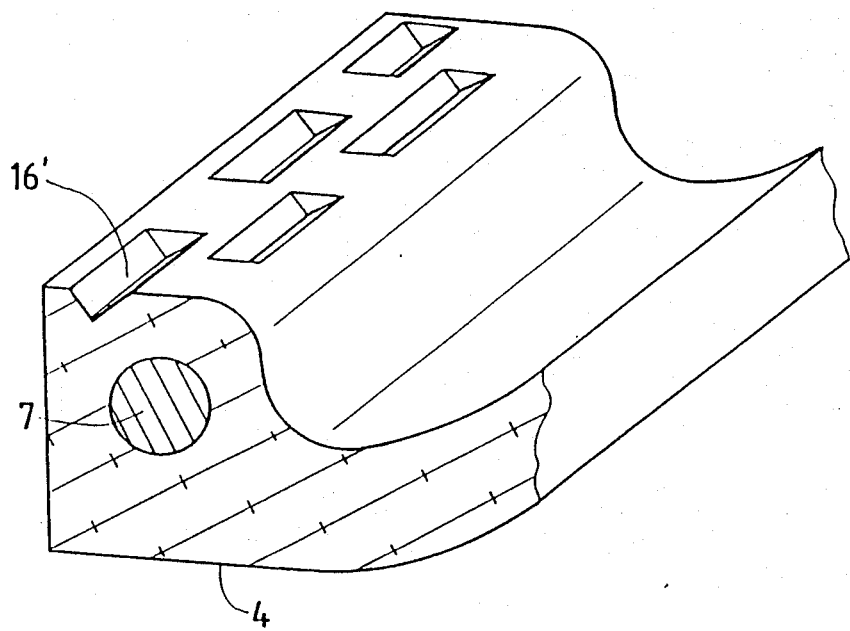
FIG. 3 is an isometric view of a portion of a tire in the region of the bead thereof, with V-shaped recesses that are offset from one another being disposed in the region of the bead seating surface.
Figure 4:
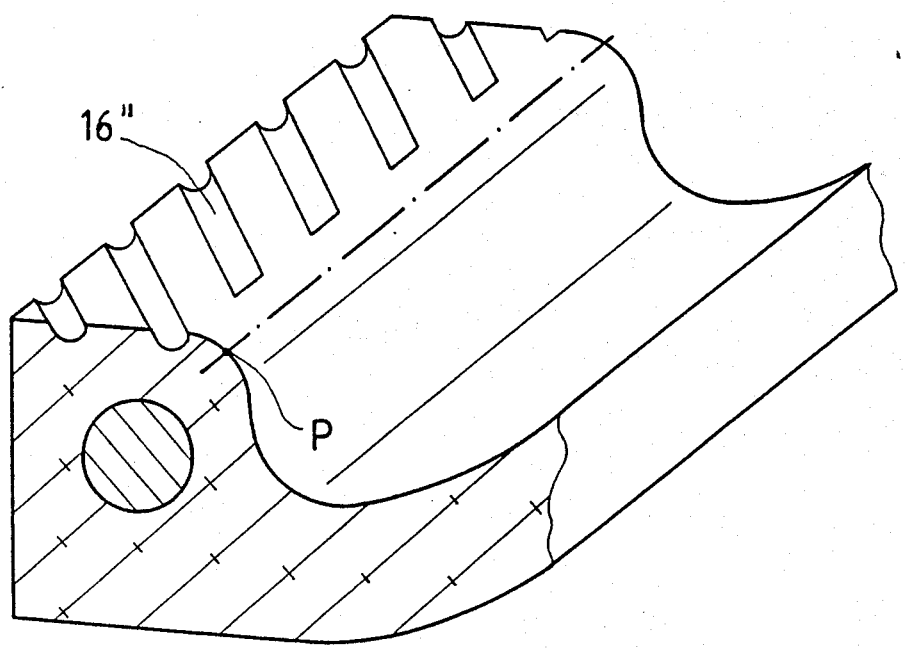
FIG. 4 is a view that shows a further portion of a tire in the bead region with U-shaped recesses that extend at an angle to the circumferential direction being disposed in the bead seating surface.

FIG. 3 illustrates a tire section in the region of a tire bead 4. Here V-shaped recesses 16' that are offset relative to one another are disposed in the bead seating surface 13. The recesses 16' are disposed in two adjacent rows; however, it should be understood that three or four rows of recesses could be provided, and the recesses could be longer than those illustrated. Pursuant to another possible variation, the recesses 16', rather than extending exactly in the circumferential direction, could extend at an angle. In an extreme case, the recesses could, if desired, even extend in the axial direction, i.e. perpendicular to the circumferential direction FIG. 4 shows a further embodiment where the recesses 16" have a U-shaped cross-sectional configuration and extend at an angle to the circumferential direction of the tire in the region of the bead 4. The recesses 16" are shown as extending parallel to one another, and end axially outwardly prior to reaching the region P (see FIG. 2) in order not to endanger a sealing effect of the tire bead 4.

It is to be understood that still other variations of recesses in the region of the bead seating surface 13 are possible. In addition, elements of the previously described variations could be combined with one another. In the case of truck tires, the geometric dimensions must, of course, be adapted to conform to the size of these tires, so that, for example, the depth of the grooves 16 could be up to 8 mm.

Figure 5:
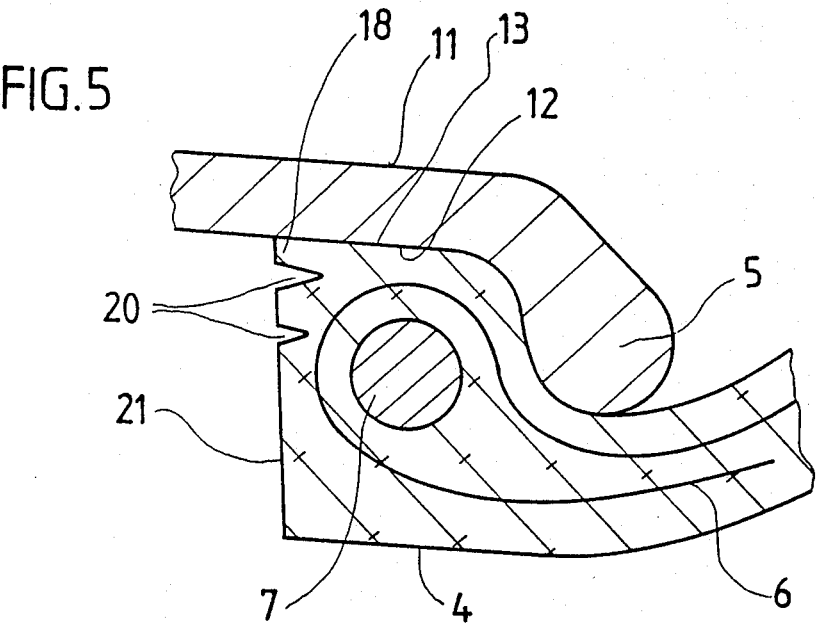
FIG. 5 is a partial radial cross-sectional view of another exemplary embodiment of the inventive tire and wheel assembly, with that side of the tire bead that faces the central radial plane of the assembly being provided with channel-like notches.

FIG. 5 shows a somewhat different solution to the problem. The configuration of the rim ring 2 corresponds to that of the embodiment of FIG. 1; in other words, the rim ring 2 has radially outer support surfaces 11 with radially inner rim seating surfaces 12 as well as radially inwardly extending rim flanges 5. Again disposed in the tire bead 4 is a pressure-resistant bead core 7 that serves for the anchoring of the carcass 6. The thickness of the rubber material radially outwardly of the bead core 7 is selected in such a way that after the tire has been inflated, a compression pressure is obtained in the bead seating surface 13 at the level of the core 7, with this compression pressure only slightly exceeding a value of zero. In contrast, in the region of the bead bases 18 the compression pressure should again be between 8 and 56%, with a particularly favorable value being about 30%. In order in this region to be able to compensate for tolerance differences during the manufacture of the rim and tire, however, recesses are not provided in the region of the bead seating surface 13. Rather, notches 20 are provided that preferably extend in the circumferential direction and that ar disposed in that side 21 of the tire bead 4 that faces the central radial plane of the vehicular tire and wheel assembly; these notches 20 are preferably disposed radially outwardly in the vicinity of the bead bases 18. The notches 20 can have a depth of 10 mm, and again have a V-shaped or U-shaped cross-sectional configuration.

Figure 6:
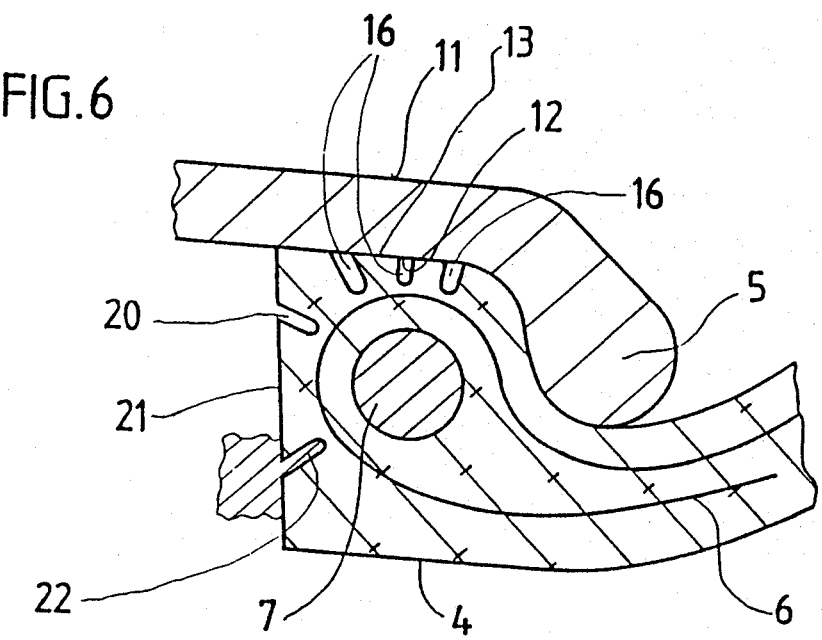
FIG. 6 is a partial radial cross-sectional view of another exemplary embodiment of the inventive tire and wheel assembly, with the tire bead being provided with recesses not only in the bead seating surface but also on the axially inner side.

FIG. 6 shows a variation of the present invention that is obtained by combining the embodiments of FIGS. 1 to 4 with the embodiment of FIG. 5. In this connection, the rim ring 2 corresponds to that of the embodiments of FIGS. 1 to 5, so that it again is provided with radially outer support surfaces 11, radially inner rim seating surfaces 12, and radially extending rim flanges 5. Again disposed in the tire bead 4 is a pressure-resistant bead core 7 about which the carcass 6 is anchored.

To achieve a desired compression with which the bead seating surfaces 13 of an inflated tire rest against the rim seating surfaces 12, not only are recesses 16 disposed in the bead seating surfaces 13, but groove-like recesses 20 are disposed on the axially inner side 21. Not only the widths but above all the depths of the recesses 16 and 21 can differ from one another. Furthermore, it is frequently expedient, in order to achieve a greater flexibility in the region of the bead seating surfaces 13, to arrange the recesses 16 and/or 20 in such a way that their central planes are not disposed at right angles to the surfaces 13, 21, but rather at differently inclined angles. However, in so doing care must be taken to ensure that after vulcanization it is still possible for the tire to be removed from the mold in the region of the recesses 16 and 20.

Pursuant to a further embodiment of the present invention, which is also indicated in FIG. 6, the recesses 16 and 20 are designed in such a way that their bases end in the vicinity of the carcass 6. In such a case, the ribs 22 that serve to form the recesses during vulcanization of the tire serve at the same time to fix the bead core 7 in the tire bead 4 in order to prevent "floating" during the vulcanization.

The present invention is, of course, in no way restricted to the specific disclosure of the specification and drawings, but also encompasses any modifications within the scope of the appended claims.

What we claim is:

1. In a vehicular pneumatic tire and wheel assembly that includes a rigid wheel rim, which is provided with essentially radially inwardly extending rim flanges, rim seating surfaces that are disposed on the radially inner side of the rim ring and are straight as inclined in the transverse direction, and a recessed mounting bed for each tire bead having a bead core and a base portion including a bead base and a level at a center of the bead core respectively therewith, and that also includes a pneumatic tire of elastomeric material and carcass fabric mounted on said rim, with bead seating surfaces of the tire beads being disposed adjacent to said rim flanges on said rim seating surfaces on the radially inner side of said rim ring, and with the carcass of the tire being anchored in said tire beads by being looped about pressure-resistant bead cores, comprising the improvement therewith wherein:

each tire bead is provided with recess means disposed in at least one surface thereof in such a way that when said mounted tire is inflated to operating pressure, a base portion of said tire bead that rests against said rim seating surface exerts on said rim seating surface a predetermined compression pressure that is in a range of from 8 to 56% in a region of the bead bases and at the level of the center of the bead core is from 1 to 26 % and lower than the predetermined compression pressure at the bead bases, the compression pressure at the level of the center of the bead core being defined as the ratio of pertaining rubber thickness beneath the bead core to the distance between the core and the rim for a method of measuring compression pressure with rubber thickness including the carcass fabric above the core being critical so that compression pressure by an equation $$\left( \frac{w_1}{F_1} - 1 \right) \cdot 100\%$$

with $w_1$ being the rubber thickness, including the carcass fabric, between a radially outer edge of the bead core and a radially outer surface of the bead at the level of the center of the bead core with the tire relaxed, and $F_1$ being the distance between the radially outer edge of the bead core and the rim ring at the level of the center of the bead core with the tire mounted and similarly the compression pressure at the bases of the beads is defined by an equation $$\left( \frac{W_2}{F_2} - 1 \right) \cdot 100\%$$

with $W_2$ being the rubber thickness, including the carcass fabric, between a line that extends parallel to an axis of rotation of the tire and through a radially outer edge of the bead core, and a radially outer surface of the bead at the level of the bead bases, and $F_2$ being the distance between a line parallel to the axis of rotation of the tire and through the radially outer edge of the bead core, and the rim ring at the level of the bead bases with a mounted tire.

2. A vehicular pneumatic tire and wheel assembly according to claim 1, in which said recess means extend in the circumferential direction of said tire.

3. A vehicular pneumatic tire and wheel assembly according to claim 2, in which said recess means are discontinuously extending recesses.

4. A vehicular pneumatic tire and wheel assembly according to claim 3, in which said recesses are offset relative to one another in the circumferential direction.

5. A vehicular pneumatic tire and wheel assembly according to claim 1, in which said recess means have a V-shaped cross-sectional configuration.

6. A vehicular pneumatic tire and wheel assembly according to claim 1, in which said recess means have a U-shaped cross-sectional configuration.

7. A vehicular pneumatic tire and wheel assembly according to claim 1, in which said recess means are recesses of varying depth.

8. A vehicular tire and wheel assembly according to claim 1, in which said recess means are recesses having a central plane, at least some of which extend at an angle to said surface of said tire in which they are disposed.

9. A vehicular pneumatic tire and wheel assembly according to claim 1, in which said recess means are discontinuously extending recesses that extend at an angle to the circumferential direction of said tire.

10. A vehicular pneumatic tire and wheel assembly according to claim 1, which includes a tire mold for vulcanizing said tire, with said mold being provided with ribs that serve to form said recess means and also to fix the position of said bead cores during vulcanization.

11. A vehicular pneumatic tire and wheel assembly according to claim 1, in which said recess means of each tire bead are in the form of recesses provided in said bead seating surface of said tire bead, with said recesses being delimited by raised portions disposed between them as well as by said base portion of said bead, with said raised portions, when said tire is mounted on said rim and is inflated to operating pressure, exerting on said rim seating surface a compression pressure that in the vicinity of said base portion is in a range of from 8 to 56%, and at the level of the center of said bead core is in a range of from 1 to 26%.

12. A vehicular pneumatic tire and wheel assembly according to claim 11, in which said recesses in said bead seating surface remove up to 40% of the total bead seating surface.

13. A vehicular pneumatic tire and wheel assembly according to claim 11, in which said recesses and said raised portions extend in the circumferential direction of said tire.

14. A vehicular pneumatic tire and wheel assembly according to claim 11, for use as a passenger car tire, with said recesses being provided as two to four adjacent grooves having a width of 2 to 3 mm and a maximum depth of 4 mm.

15. A vehicular pneumatic tire and wheel assembly according to claim 11, for use as a truck tire, with said recesses having a maximum depth of 8 mm.

16. A vehicular pneumatic tire and wheel assembly according to claim 1, in which said recess means of each tire bead are provided in a side surface of said tire bead that faces a central radial plane of said tire, and are provided at least in the vicinity of said base portion of said bead.

17. A vehicular pneumatic tire and wheel assembly according to claim 16, in which said recess means are in the form of channel-shaped notches.

18. A vehicular pneumatic tire and wheel assembly according to claim 1, in which said recess means of each tire bead are provided both in said bead seating surface of said bead as well as in an axially inner side surface of said tire bead that faces a central radial plane of said tire.

* * * * *